Patented Sept. 24, 1946

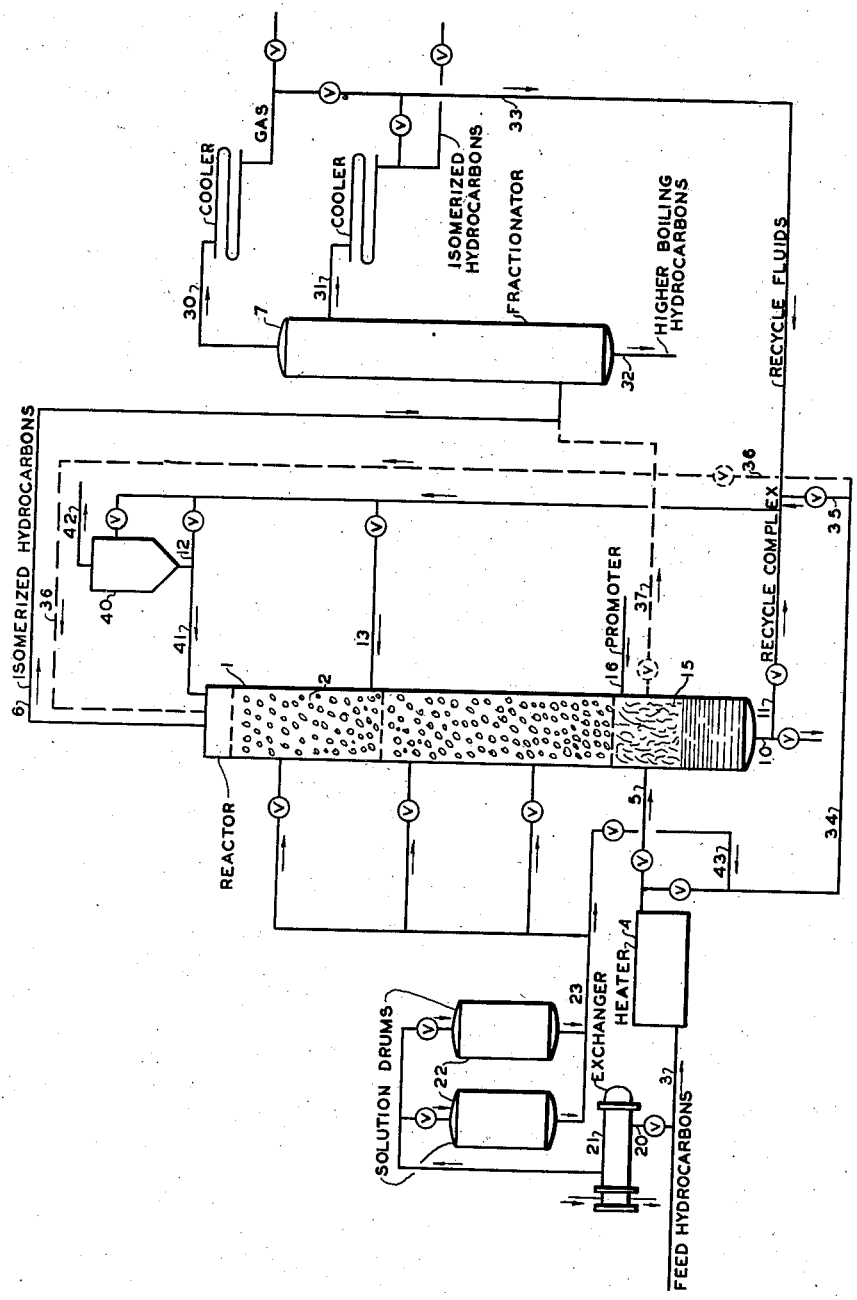

2,408,186

UNITED STATES PATENT OFFICE 2,408,186

CATALYTIC CONVERSION OF HYDROCARBONS

Harold V. Atwell, Beacon, and Howard H. Gross, Pleasantville, N. Y., assignors to The Texas Company, New York, N. Y., a corporation of Delaware Application May 18, 1944, Serial No. 536,088

12 Claims. (Cl. 260—683.5)

This invention relates to the catalytic conversion of hydrocarbons and particularly to catalytic conversion with a liquid metallic halide-hydrocarbon complex type of catalyst.

The invention involves moving a body of hydrocarbons undergoing conversion in continuous liquid phase through a reaction zone while in direct contact with a liquid catalyst moving through the reaction zone in dispersed or discontinuous liquid phase. The flowing fluids are maintained at a predetermined temperature such that substantial conversion occurs during flow through the reaction zone.

The invention is applicable to the isomerization of saturated hydrocarbons by contact with an aluminum halide-complex catalyst in the presence of hydrogen halide, the reaction being carried out in a reaction tower advantageously packed with inert contact material such as Raschig rings and Berl saddles. It is advantageous to employ a ceramic material such as clay or porcelain which is preferentially wetted by the catalyst complex liquid.

In accordance with the invention the reaction tower is filled with a column of liquid hydrocarbons moving through the tower in continuous liquid phase. The complex catalyst is introduced to the upper portion of the tower in a dispersed form and descends through the column of hydrocarbon liquid over the contact material.

The column of hydrocarbon liquid may rise through the tower countercurrently to the descending catalyst liquid or in the alternative, the hydrocarbon liquid may descend through the tower concurrently with the catalyst liquid.

One advantage in employing the liquid catalyst in dispersed form as contemplated by the present invention is that it permits concurrent downward flow of both hydrocarbons and catalyst. The aluminum halide-hydrocarbon complex type of catalyst is relatively more dense than the hydrocarbons usually undergoing treatment. Therefore when the complex catalyst is in continuous phase it is impossible to operate with downward flow of hydrocarbons undergoing conversion.

In certain operations up flow of hydrocarbons may be preferred, as for example in the treatment of relatively low molecular weight hydrocarbons such as butane in which aluminum halide is relatively more soluble than in higher molecular weight hydrocarbons. Consequently, catalyst migration is a problem when treating relatively low molecular weight hydrocarbons.

The present invention provides a means for avoiding catalyst migration, as for example in the isomerization of normal butane. Thus in accordance with the present invention the complex catalyst containing the highest concentration of aluminum halide is maintained in an intermediate portion of the reaction tower. The concentration of aluminum halide in the complex is maintained relatively low in the hydrocarbon exit portion of the reaction tower so that the exit hydrocarbon stream is substantially free from dissolved aluminum halide.

In accordance with the present invention the make-up aluminum halide is introduced to the reaction tower at an intermediate point. Therefore with the upward flow of hydrocarbons the aluminum chloride concentration in the catalyst is relatively higher in the intermediate section of the reaction tower than it is in either the upper or lower portion of the reaction tower.

In order to describe the invention in more detail reference will now be made to the accompanying drawing illustrating a diagram of flow.

In the drawing the numeral 1 designates a reaction tower packed with inert packing material 2 such as Raschig rings.

When operating the tower for the isomerization of normal butane a stream of normal butane is drawn from a source not shown through a pipe 3 and conducted through a heater 4 wherein it is heated to the temperature in the range about 200 to 240° F. or even as high as 300° F. The heated normal butane is then conducted through a pipe 5 to the lower portion of the tower 1. The pressure in the tower is maintained in the range about 150 to 400 pounds per square inch gauge and sufficient to maintain the normal butane liquefied. The normal butane liquid rises through the contact material and provides a continuous column of hydrocarbon liquid within the tower. The hydrocarbon liquid overflows from the top of the tower through a pipe 6 leading to a fractionating unit 7.

The aluminum chloride-hydrocarbon complex characterized by a heat of hydrolysis in the range about 280 to 300 calories per gram of complex accumulates in the bottom of the tower and is continuously drawn off through a pipe 10. All or a portion of this complex is passed through a branch pipe 11 and returned either to the top of the tower or to an intermediate point through branch pipes 12 and 13. Thus the recycled complex liquid may be returned to the top of the tower and distribution thereof effected by means of a perforated plate 14. The dispersed catalyst drops descend through the contact material forming thin films of catalyst on the contact material. The catalyst drops eventually trickle to the bottom of the tower. In the bottom of the tower settling space is provided so that stratification between the catalyst and hydrocarbon liquid occurs forming an interface 15 between the hydrocarbon liquid and relatively more dense complex catalyst.

As indicated, provision is made for introducing a promoter such as hydrogen chloride from a source not shown through a pipe 16.

In commencing the operation of the reaction tower preformed complex catalyst or the catalyst remaining from a preceding operation is used. Preformed complex may be prepared by reacting aliphatic hydrocarbons with aluminum chloride in the presence of a small amount of promoter. The complex catalyst is advantageously free from undissolved solid aluminum chloride. During continued operation it is desirable to maintain the activity of the complex catalyst by the addition of a small amount of fresh aluminum halide which enters into complex formation with a small portion of the feed hydrocarbon so that some complex is formed in situ during the course of continued operation.

The make-up aluminum halide can be added as a solution in a portion of the feed stream. Thus a portion of normal butane may be by-passed through a pipe 20 being either heated or cooled during passage through an exchanger 21 and then conducted to either one of a plurality of vessels 22. The vessels 22 contain solid aluminum chloride in lump or granular form. The normal butane stream which may be added at about room temperature is conducted downwardly through one of the vessels 22 so that solution of aluminum halide in the butane occurs. Solution is advantageously effected in the absence of added hydrogen chloride.

The resulting solution is conducted through a pipe 23 to the intermediate portion of the reaction tower 1. The solution may be introduced at one or more succeeding points as indicated.

The proportion of butane by-passed through the vessels 22 may amount to 10 to 30 per cent of the total butane feed passing to the reaction tower. The amount of butane passed through the vessels 22 and the temperature of solution may be varied, however, depending upon the amount of aluminum halide which must be added in order to maintain the complex catalyst at the predetermined level of activity.

In isomerizing normal butane a complex catalyst having a heat of hydrolysis of about 300 to 330 calories per gram of complex is quite effective.

However, in the operation of tower 1 as just described the complex catalyst in the intermediate section of the tower will have a heat of hydrolysis of about 330 to 340 calories per gram of complex while the activity in the terminal sections will be relatively lower. For example, the complex being drawn off through the pipe 10 may have a heat of hydrolysis of about 280 while the complex near the top of the contact material will have a heat of hydrolysis of about 300.

The fresh feed hydrocarbons entering at the bottom of the tower effect a stripping action upon the complex so that free aluminum halide is washed from the descending complex and carried upwardly into the tower. Thus the complex being drawn off is relatively lean in aluminum halide. This lean complex when returned to the top of the tower becomes enriched in aluminum halide so that the lean complex in the upper part of the tower operates to selectively extract aluminum halide from the hydrocarbons approaching the top of the tower. In this way dissolved aluminum halide is removed from the effluent hydrocarbon stream.

The effluent hydrocarbons comprising isobutane and unreacted normal butane and, in addition, a promoter and a small amount of gaseous hydrocarbons are conducted through the pipe 6 to the fractionation unit 7 as previously mentioned. The fractionation unit may comprise two or more towers with provision for stripping out the promoter and also for effecting separation between isobutane and normal butane.

In the drawing a single tower is shown with provision for removing a gaseous fraction through a pipe 30, a side stream comprising isomerized hydrocarbons through a pipe 31 and a residual fraction comprising unreacted hydrocarbons through a pipe 32.

Provision may be made for recycling unreacted hydrocarbons and also for recyling the promoter.

If desired some of the recycled streams may be used in part to aid in recycling of the used complex through the pipe 11. For this purpose a stream of isomerized hydrocarbons in vapor form may be by-passed through the pipe 33 and passed to the pipe 11 as indicated. In this way the vaporized hydrocarbons are used as a gas lift to lift the recycled complex through the pipe 11 and discharge it into the upper sections of the reaction tower.

On the other hand a small portion of the feed butane stream may be used to provide the gas lift, and in such case a portion of the heated butane is by-passed through a pipe 34 and branch 35. The promoter may be added or recycled to the system by way of this lift.

A liquid rather than a gaseous lifting medium may be employed. Thus part of the butane feed may be used as the liquid lifting medium. In such case the butane so used may also contain dissolved aluminum chloride required for maintaining catalyst activity. This latter arrangement is advantageously employed when recycling the complex to an intermediate portion of the reaction tower. The stream of butane containing dissolved aluminum halide is conducted from pipe 23 through pipe 43 which communicates with pipe 34.

Instead of discharging directly into the tower, the complex may be lifted into an elevated receiver 40 from which it gravitates through a pipe 41 and pipe 12 into the top of the reactor. The lifting agent may thus separate from the complex in the receiver 40 and be discharged therefrom through a pipe 42.

In the foregoing description upflow of feed butane through the tower has been described. It is contemplated, however, that downflow may be employed.

Where downflow of feed hydrocarbons is employed the feed stream may be passed through the pipe 34 and pipe 35 (shown in broken line) through which it is passed to the top of the tower. In this case the product stream is continually drawn off from the lower portion of the tower through pipe 37 (shown in broken line) and conducted to the fractionating unit 7 as indicated.

While aluminum chloride has been specifically mentioned it is intended that other Friedel-Crafts type metallic halides such as aluminum bromide and zirconium chloride, etc. may be employed.

Likewise the promoter may comprise other hydrogen halides.

It is also contemplated that other saturated hydrocarbons besides normal butane may be isomerized. Individual hydrocarbons boiling within the gasoline range may be charged or mixtures thereof. Preferably the feed hydrocarbons are substantially free from aromatic and olefinic constituents although in isomerizing normally liquid saturated gasoline hydrocarbons such as pentane it may be desirable to add a small amount of low boiling aromatic hydrocarbons such as benzene and toluene for the purpose of inhibiting cracking and other side reactions. The amount of aromatic hydrocarbons added is in the range about .1 to .5 per cent and preferably not in excess of 1 per cent by weight of the feed hydrocarbon undergoing conversion.

Isomerization has been specifically described. However, it is contemplated that the invention is applicable to effecting other conversion reactions such as the alkylation of olefins with isoparaffins by contact with an aluminum halide-hydrocarbon complex catalyst.

The activity of the complex catalyst used may be varied depending upon the type of conversion reaction being carried out but usually the aluminum halide-hydrocarbon complex will be characterized by having a heat of hydrolysis within the range 200 to 400 small calories per gram of complex catalyst.

The reaction temperatures employed may range from 0 to about 300 to 350° F.

Obviously many modifications and variations of the invention, as hereinbefore set forth, may be made without departing from the spirit and scope thereof, and therefore only such limitations should be imposed as are indicated in the appended claims.

We claim:

1. In a continuous process for converting hydrocarbons by the action of an aluminum halide-hydrocarbon complex catalyst of predetermined activity in the presence of hydrogen halide the steps which comprise maintaining a reaction tower substantially filled with a column of feed hydrocarbon in continuous liquid phase, said tower being packed with inert contact material, continuously introducing feed hydrocarbon to the lower portion of the tower such that feed hydrocarbon rises through the tower while undergoing catalytic conversion, continuously introducing complex catalyst liquid to the upper portion of the tower, moving the catalyst in dispersed phase downwardly through the tower, continuously withdrawing used complex from the bottom of the tower, recycling withdrawn complex to the upper portion of the tower, introducing a small amount of fresh aluminum halide to the tower at an intervening point between, and removed substantially from, the points of used catalyst withdrawal from, and return to, the tower and sufficient to maintain the concentration of aluminum halide in the complex relatively greater in the intervening portion than in the upper and lower portions of the tower, maintaining the reaction tower at elevated temperature sufficient to effect said conversion, and continuously removing from the upper portion of the tower, hydrocarbon products of reaction substantially free from aluminum halide.

2. A continuous process for isomerizing saturated hydrocarbons by the action of aluminum halide-hydrocarbon complex of predetermined catalyst activity in the presence of hydrogen halide which comprises maintaining in a reaction tower an elongated column of feed hydrocarbon in continuous liquid phase, continuously supplying fresh feed to the lower portion of the tower such that the hydrocarbon liquid rises through the tower while undergoing conversion therein, continuously introducing complex catalyst to the upper portion of the tower, causing the introduced complex to descend in dispersed liquid phase through the hydrocarbon liquid body, withdrawing used complex from the bottom of the tower, recycling withdrawn complex to the upper portion of the tower maintaining the countercurrently flowing liquids within the tower at a temperature sufficiently elevated to effect isomerization of the isomerized hydrocarbons, withdrawing hydrocarbons substantially free from aluminum halide from the top of the tower and introducing a small amount of aluminum halide to the tower at an intervening point between, and removed substantially from, the points of used complex withdrawal and isomerized hydrocarbon removal and sufficient in amount to maintain said predetermined activity.

3. The process according to claim 2 in which the complex catalyst within the reaction tower is characterized by having a heat of hydrolysis within the range 280 to 330 calories per gram of complex.

4. The process according to claim 2 in which the complex catalyst of greatest activity is maintained within the intermediate portion of the reaction tower.

5. A continuous process for converting hydrocarbons by contact with a liquid Friedel-Crafts metallic halide-hydrocarbon complex catalyst in the presence of hydrogen halide by continuous countercurrent flow of hydrocarbons and catalyst through a reaction tower which comprises introducing a stream of feed hydrocarbon to the lower portion of an elongated reaction tower, introducing a stream of complex catalyst to the upper portion of said tower, moving the hydrocarbons upwardly through the tower in continuous liquid phase and in direct contact with downwardly flowing complex catalyst in dispersed liquid phase and in the presence of hydrogen halide at a temperature in the range from 0 to about 350° F. such that substantial conversion of hydrocarbons occurs, continuously discharging a stream containing converted hydrocarbons from the upper portion of the tower, said hydrocarbons being substantially free from dissolved metallic halide, continuously discharging a stream of used complex of relatively low metallic halide concentration from the bottom portion of said tower, recycling discharged complex to the upper portion of the tower, introducing metallic halide to said tower at an intervening point between, and substantially removed from, the points of converted hydrocarbon and used catalyst discharge, and regulating the rate of said metallic halide introduction such that the concentration of metallic halide in the complex catalyst in said intervening portion is substantially greater than in the complex in the terminal portions of said tower.

6. The process according to claim 5 in which the metallic halide is aluminum halide.

7. A continuous process for isomerizing saturated hydrocarbons by contact with an aluminum halide-hydrocarbon complex catalyst in the presence of hydrogen halide by continuous countercurrent flow of hydrocarbons and catalyst through a reaction tower which comprises introducing a stream of feed hydrocarbon to the lower portion of an elongated reaction tower, introducing a stream of complex catalyst to the upper portion of said tower, moving the hydrocarbons upwardly through the tower in continuous liquid phase and in direct contact with downwardly flowing complex catalyst in dispersed liquid phase and in the presence of hydrogen halide at an elevated temperature in the range up to about 350° F. such that substantial isomerization of hydrocarbons occurs, continuously discharging a stream containing isomerized hydrocarbons from the upper portion of said tower, said hydrocarbons being substantially free from dissolved aluminum halide, continuously discharging a stream of used complex of relatively low aluminum halide concentration from the bottom portion of the tower, recycling discharged complex to the upper portion of the tower, introducing aluminum halide to said tower at an intervening point between and substantially removed from, the points of isomerized hydrocarbon and used catalyst discharge, and regulating the rate of said aluminum halide introduction such that the concentration of aluminum halide in the complex in said intervening portion is substantially greater than in the complex in the terminal portions of said tower.

8. The process according to claim 7 in which the heat of hydrolysis of the complex in the intermediate section of the tower is about 340 calories and in the upper portion of the tower about 280 calories while that in the bottom portion of the tower is about 300 calories.

9. A continuous process for converting hydrocarbons by the action of an aluminum halide-hydrocarbon complex catalyst of predetermined activity in the presence of hydrogen halide which comprises maintaining in a reaction tower an elongated column of feed hydrocarbon in continuous liquid phase, continuously supplying fresh feed hydrocarbon to the lower portion of the tower such that the hydrocarbon liquid rises through the tower while undergoing conversion therein, continuously introducing complex catalyst to the upper portion of the tower, causing the introduced complex to descend in dispersed liquid phase through the hydrocarbon liquid body, withdrawing used complex from the bottom of the tower, recycling withdrawn complex to the upper portion of the tower, introducing a small amount of aluminum halide to the tower at an intervening point between, and substantially removed from, the points of used complex withdrawal from, and return to, the tower and sufficient to maintain the concentration of aluminum halide in the complex relatively greater in the intervening portion than in the upper and lower portions of the tower, maintaining the reaction tower at a temperature sufficient to effect said conversion, and continuously removing from the upper portion of the tower hydrocarbon products of reaction substantially free from aluminum halide.

10. In the catalyst conversion of hydrocarbons by the action of Friedel-Crafts metallic halide-hydrocarbon complex catalyst of predetermined activity in the presence of hydrogen halide, the steps comprising continuously moving a body of feed hydrocarbon in continuous liquid phase upwardly through a vertical reaction zone, continuously moving downwardly through the reaction zone complex catalyst in dispersed liquid phase, causing the hydrocarbon body and the catalyst to flow in direct countercurrent contact with each other through the reaction zone, maintaining both fluids at reaction temperature during flow through the reaction zone such that substantial conversion of hydrocarbons occurs, continuously supplying fresh feed hydrocarbon to the lower portion of the reaction zone to provide said body of hydrocarbons flowing therethrough, continuously withdrawing converted hydrocarbons from the upper portion of the reaction zone, introducing a small amount of metallic halide to the reaction zone at an intervening point between the points of converted hydrocarbon withdrawal and feed hydrocarbon introduction to the reaction zone, and regulating the amount of metallic halide so introduced such that the concentration of metallic halide in the complex is relatively greater in the intervening portion of the reaction zone than in the upper and lower portions thereof.

11. The method according to claim 10 in which the metallic halide is aluminum halide.

12. The method according to claim 10 in which the metallic halide is aluminum chloride.

HAROLD V. ATWELL.
HOWARD H. GROSS.